US010455824B2

(12) United States Patent
Lawrence et al.

(10) Patent No.: US 10,455,824 B2
(45) Date of Patent: Oct. 29, 2019

(54) AGRICULTURAL CROP APPLICATION SYSTEM

(71) Applicant: Rick Eugene Lawrence, Blue Earth, MN (US)

(72) Inventors: Rick Eugene Lawrence, Blue Earth, MN (US); Joseph Peter Goche, Fairmont, MN (US)

(73) Assignee: Rick Eugene Lawrence, Blue Earth, MN (US)

( * ) Notice: Subject to any disclaimer, the term of this patent is extended or adjusted under 35 U.S.C. 154(b) by 0 days.

(21) Appl. No.: 14/931,842

(22) Filed: Nov. 3, 2015

(65) Prior Publication Data

US 2016/0120117 A1    May 5, 2016

Related U.S. Application Data

(60) Provisional application No. 62/074,217, filed on Nov. 3, 2014.

(51) Int. Cl.
| | |
|---|---|
| *B05B 13/00* | (2006.01) |
| *A01M 7/00* | (2006.01) |
| *A01C 23/00* | (2006.01) |
| *B05B 1/20* | (2006.01) |

(52) U.S. Cl.
CPC ......... *A01M 7/0053* (2013.01); *A01C 23/008* (2013.01); *A01M 7/00* (2013.01); *B05B 1/20* (2013.01); *B05B 13/005* (2013.01)

(58) Field of Classification Search
CPC .. A01M 7/0053; A01M 7/0057; A01M 7/005; B05B 13/005; B05B 1/20; A01C 23/008; Y10T 403/32614; Y10T 403/32819

USPC ..... 239/146–176; 285/184, 186; 248/65, 70, 248/74.1, 74.5, 292.13
See application file for complete search history.

(56) References Cited

U.S. PATENT DOCUMENTS

| | | | | | |
|---|---|---|---|---|---|
| 1,348,038 | A | * | 7/1920 | Neumeyer | A01M 7/005 111/121 |
| 1,526,642 | A | * | 2/1925 | Nissley | A01M 7/005 239/164 |
| 1,620,862 | A | * | 3/1927 | Atkins | F16J 15/186 285/121.3 |
| 1,626,772 | A | * | 5/1927 | Worden | F28F 9/0239 165/83 |

(Continued)

*Primary Examiner* — Viet Le
(74) *Attorney, Agent, or Firm* — Skaar Ulbrich Macari, P.A.

(57) ABSTRACT

A movable agricultural product applicator system for dispensing various agricultural-related products along the ground surface of agricultural crops is provided. The application system provides a hose assembly interconnecting a supporting boom and an applicator, wherein the applicator drags along the ground surface dispensing product as the supporting boom moves by a carrier. The application system may include a swivel connection facilitating a rotational and pivotal connection of the hose assembly to the supporting boom, wherein a mounting assembly removably mounts the application system to the supporting boom. The hose assembly is designed with bending properties that enable the applicator to self-center and locate rows between crops as it is being dragged along the ground surface, as well as enable the applicator to surf above obstacles.

13 Claims, 7 Drawing Sheets

(56) References Cited

U.S. PATENT DOCUMENTS

| | | | | |
|---|---|---|---|---|
| 1,629,041 A * | 5/1927 | Minier | A01B 35/22 | 403/120 |
| 1,696,736 A * | 12/1928 | Scoville | F16N 21/00 | 138/120 |
| 1,718,209 A * | 6/1929 | Aldrich | F16L 39/04 | 277/398 |
| 1,774,179 A * | 8/1930 | MacGregor | F16L 27/0812 | 277/562 |
| 1,859,975 A * | 5/1932 | Malkin | F16L 39/04 | 285/121.3 |
| 1,861,532 A * | 6/1932 | Hough | G09F 13/26 | 174/138 H |
| 1,948,788 A * | 2/1934 | Goldberg | E04F 10/0618 | 403/120 |
| 1,950,093 A * | 3/1934 | Robinson | B61G 5/08 | 285/12 |
| 2,149,660 A * | 3/1939 | Blood, Jr. | E01C 19/176 | 239/169 |
| 2,169,948 A * | 8/1939 | Gallupe | A01M 7/0053 | 239/168 |
| 2,174,600 A * | 10/1939 | Schutmaat | A01G 25/09 | 138/103 |
| 2,176,295 A * | 10/1939 | Creveling | F16N 21/04 | 137/615 |
| 2,185,164 A * | 12/1939 | Weinreb | F21V 21/08 | 24/523 |
| 2,196,013 A * | 4/1940 | Govan | F16L 5/00 | 285/280 |
| 2,278,356 A * | 3/1942 | Livingston | H01R 35/02 | 248/278.1 |
| 2,288,108 A * | 6/1942 | Roll | H02G 11/003 | 248/51 |
| 2,301,213 A * | 11/1942 | Kang | A01M 7/005 | 239/162 |
| 2,503,281 A * | 4/1950 | Lynch | F16L 27/0841 | 285/181 |
| 2,529,685 A * | 11/1950 | Ginter | F16N 21/04 | 285/147.2 |
| 2,564,041 A * | 8/1951 | Vogel, Jr. | A01M 7/0078 | 239/168 |
| 2,575,521 A * | 11/1951 | Ireland | A01M 7/0075 | 16/19 |
| 2,587,938 A * | 3/1952 | Warren | B05B 15/652 | 285/184 |
| 2,594,242 A * | 4/1952 | Wilson | F21V 21/26 | 248/278.1 |
| 2,616,646 A * | 11/1952 | Matthysse | F16L 3/1091 | 174/168 |
| 2,621,882 A * | 12/1952 | Fletcher | F21V 21/26 | 248/282.1 |
| 2,717,141 A * | 9/1955 | Livingston | F21V 21/26 | 248/278.1 |
| 2,739,779 A * | 3/1956 | Krone | F16L 27/08 | 267/155 |
| 2,770,493 A * | 11/1956 | Fieber | A01M 7/00 | 239/168 |
| 2,807,486 A * | 9/1957 | Bixby | B62D 7/16 | 403/145 |
| 2,829,908 A * | 4/1958 | Brochetti | B23Q 11/0053 | 15/339 |
| 2,910,316 A * | 10/1959 | Dier | B21D 53/00 | 248/288.31 |
| 2,929,397 A * | 3/1960 | Sloan | F16L 3/2053 | 137/356 |
| 2,953,161 A * | 9/1960 | Muller | B67D 7/002 | 137/236.1 |
| 3,030,128 A * | 4/1962 | Versen | F21V 21/26 | 248/278.1 |
| 3,064,998 A * | 11/1962 | Syverson | F16L 27/08 | 285/101 |
| 3,097,865 A * | 7/1963 | Zeeb | F16L 37/23 | 285/1 |
| 3,142,501 A * | 7/1964 | Clark | F21V 21/116 | 248/230.1 |
| 3,143,146 A * | 8/1964 | Kennedy | B67D 7/002 | 138/107 |
| 3,147,568 A * | 9/1964 | Inhofer | A01M 7/0064 | 47/1.01 R |
| 3,198,480 A * | 8/1965 | Morse | F16K 27/02 | 251/144 |
| 3,230,969 A * | 1/1966 | Purtell | A01G 25/09 | 180/8.1 |
| 3,235,187 A * | 2/1966 | Merritt | A01M 7/005 | 239/169 |
| 3,386,754 A * | 6/1968 | Morrison | F16L 37/00 | 285/1 |
| 3,395,725 A * | 8/1968 | Roach | F16K 15/03 | 137/512.15 |
| 3,409,315 A * | 11/1968 | Wichers | F21V 21/26 | 285/153.3 |
| 3,421,792 A * | 1/1969 | Sundholm | F16N 3/12 | 285/102 |
| 3,430,645 A * | 3/1969 | Stalph | F16L 3/16 | 137/356 |
| 3,478,967 A * | 11/1969 | Horton | A01M 7/006 | 239/169 |
| 3,625,428 A * | 12/1971 | Mecklin | A01M 7/005 | 239/166 |
| 3,679,236 A * | 7/1972 | Warshawsky | F21V 19/02 | 285/144.1 |
| 3,730,228 A * | 5/1973 | Gibbs, Sr. | F16L 7/00 | 138/106 |
| 3,810,490 A * | 5/1974 | Ludwick | F16L 3/00 | 138/106 |
| 3,913,836 A * | 10/1975 | Stevenson | A01M 7/0053 | 239/166 |
| 3,968,933 A * | 7/1976 | Waldrum | A01C 7/004 | 239/171 |
| 4,111,465 A * | 9/1978 | Knight | B67D 9/02 | 137/615 |
| 4,429,831 A * | 2/1984 | Maddox | A01G 25/092 | 239/734 |
| 4,479,610 A * | 10/1984 | Etheridge | A01M 7/0089 | 239/171 |
| 4,521,988 A * | 6/1985 | Thacker | A01M 7/0064 | 47/1.7 |
| 4,543,007 A * | 9/1985 | Quiogue | F21V 21/30 | 285/185 |
| 4,641,781 A * | 2/1987 | McCrea | A01M 7/0064 | 239/159 |
| 4,700,017 A * | 10/1987 | Morand | H02G 3/06 | 174/86 |
| 4,736,888 A * | 4/1988 | Fasnacht | A01M 7/005 | 239/161 |
| 4,752,979 A * | 6/1988 | Goacher, Sr. | E04H 4/12 | 285/185 |
| 4,753,128 A * | 6/1988 | Bartlett | B25J 19/0016 | 16/401 |
| 4,784,324 A * | 11/1988 | DeWitt | B05B 15/68 | 239/165 |
| 4,842,195 A * | 6/1989 | Koll | B05B 15/68 | 239/1 |
| 4,844,346 A * | 7/1989 | Coffey | A01M 7/0042 | 239/166 |
| 4,970,973 A * | 11/1990 | Lyle | A01C 7/004 | 111/127 |
| 5,037,231 A * | 8/1991 | Kitamura | F16C 11/10 | 16/299 |
| 5,082,177 A * | 1/1992 | Hill | A01G 13/065 | 239/77 |
| 5,215,255 A * | 6/1993 | Kubacak | A01M 7/005 | 239/164 |
| 5,219,240 A * | 6/1993 | Kitamura | G06F 1/1616 | 16/256 |
| 5,267,695 A * | 12/1993 | Thayer | B05B 15/652 | 239/566 |
| 5,326,030 A * | 7/1994 | Benest | A01M 7/0014 | 239/1 |

(56) References Cited

U.S. PATENT DOCUMENTS

| | | | | |
|---|---|---|---|---|
| 5,435,051 | A * | 7/1995 | Cheremshynski | E04D 13/08 137/615 |
| 5,437,480 | A * | 8/1995 | Weil | F16L 27/0804 285/146.3 |
| 5,481,815 | A * | 1/1996 | Murphy | B09C 1/00 239/163 |
| 5,676,402 | A * | 10/1997 | Eley | F16L 27/08 285/190 |
| 5,685,661 | A * | 11/1997 | Marka | F16C 11/04 403/112 |
| 5,779,163 | A * | 7/1998 | Gunter | A01G 25/092 239/728 |
| 5,839,632 | A * | 11/1998 | Koday | B62J 11/00 224/414 |
| 5,893,538 | A * | 4/1999 | Onishi | F16L 3/24 248/222.52 |
| 5,904,379 | A * | 5/1999 | Chang | A61H 33/12 285/184 |
| 5,957,383 | A * | 9/1999 | Benest | A01M 7/0071 239/159 |
| 6,138,770 | A * | 10/2000 | Kayser | A01B 59/06 172/272 |
| 6,189,488 | B1 * | 2/2001 | Goldsher | A01K 7/00 119/72 |
| 6,230,091 | B1 * | 5/2001 | McQuinn | A01B 79/005 239/159 |
| 6,237,859 | B1 * | 5/2001 | Hill | A01G 13/065 239/550 |
| 6,336,764 | B1 * | 1/2002 | Liu | A46B 11/06 15/144.1 |
| 6,343,749 | B1 * | 2/2002 | Thom | A01G 25/092 239/1 |
| 6,425,149 | B1 * | 7/2002 | Wang | E03C 1/0404 285/181 |
| 6,805,304 | B1 * | 10/2004 | Nokes | A01M 7/0035 239/146 |
| 7,364,096 | B1 * | 4/2008 | Sosnowski | A01C 23/008 239/166 |
| 7,419,127 | B2 * | 9/2008 | Buehler | E03C 1/06 248/292.12 |
| 7,478,972 | B2 * | 1/2009 | Takamori | G06F 1/1622 248/292.13 |
| 7,490,807 | B2 * | 2/2009 | Souza | F16M 11/10 108/1 |
| 7,883,035 | B2 * | 2/2011 | Coleman | A01G 25/092 239/728 |
| 7,931,650 | B2 * | 4/2011 | Winquist | A61B 17/6458 606/59 |
| 8,083,432 | B2 * | 12/2011 | Limpert | F16L 3/16 24/336 |
| 8,132,741 | B2 * | 3/2012 | Tremblay, Jr. | A01M 7/0064 239/127 |
| 8,960,613 | B2 * | 2/2015 | White | A63B 31/00 248/70 |
| 9,167,745 | B2 * | 10/2015 | Muff | A01C 23/028 |
| 9,347,208 | B2 * | 5/2016 | Quinn | E03C 1/0412 |
| 9,453,376 | B1 * | 9/2016 | Raymond | E21B 17/20 |
| 9,894,892 | B2 * | 2/2018 | Lawrence | B05B 13/005 |
| 10,130,052 | B2 * | 11/2018 | Muff | A01G 25/02 |
| 2002/0113423 | A1 * | 8/2002 | Kim | A44B 11/2546 280/801.1 |
| 2003/0019949 | A1 * | 1/2003 | Solie | A01C 23/047 239/172 |
| 2005/0047851 | A1 * | 3/2005 | Molenaar | B60G 7/005 403/122 |
| 2006/0060735 | A1 * | 3/2006 | Oddsen, Jr. | F16M 11/105 248/278.1 |
| 2009/0224122 | A1 * | 9/2009 | Liao | B60R 11/0252 248/292.13 |
| 2010/0224737 | A1 * | 9/2010 | LaFontaine | F16L 3/20 248/70 |
| 2011/0017880 | A1 * | 1/2011 | Osborn | F16L 3/04 248/74.1 |
| 2011/0114803 | A1 * | 5/2011 | Lee | A61G 13/101 248/70 |
| 2012/0200078 | A1 * | 8/2012 | Puluc | F16L 33/00 285/61 |
| 2012/0280490 | A1 * | 11/2012 | White | A63B 31/00 285/188 |
| 2013/0043326 | A1 * | 2/2013 | Muff | A01C 23/028 239/159 |
| 2013/0092766 | A1 * | 4/2013 | Schottler | A01C 23/001 239/748 |
| 2013/0343806 | A1 * | 12/2013 | Ng | F16M 11/2021 403/120 |
| 2014/0124629 | A1 * | 5/2014 | Myerchin | F16M 11/046 248/70 |
| 2014/0138496 | A1 * | 5/2014 | Jones | F16L 3/18 248/70 |
| 2014/0283442 | A1 * | 9/2014 | Thomas | A01G 22/00 47/1.5 |
| 2015/0159777 | A1 * | 6/2015 | White | A63H 23/10 248/74.1 |
| 2016/0081321 | A1 * | 3/2016 | Schnaider | A01C 23/047 248/70 |
| 2016/0177993 | A1 * | 6/2016 | Anderson | B60M 1/24 248/70 |

* cited by examiner

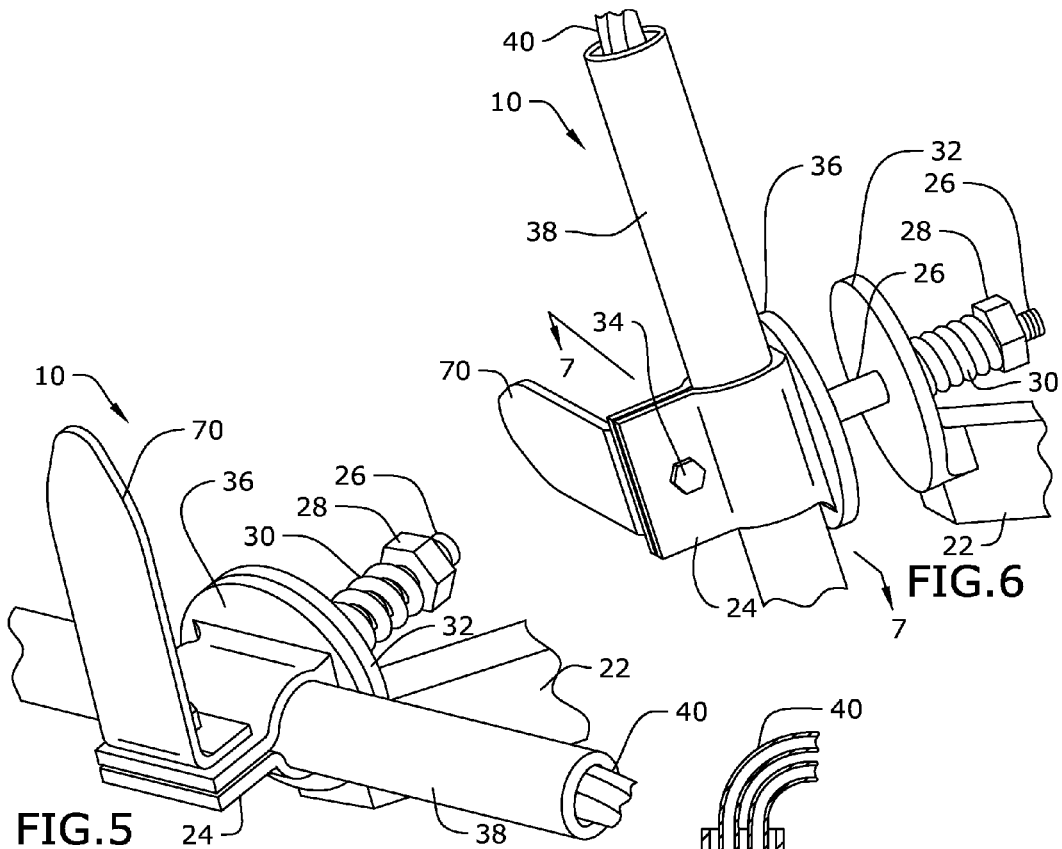
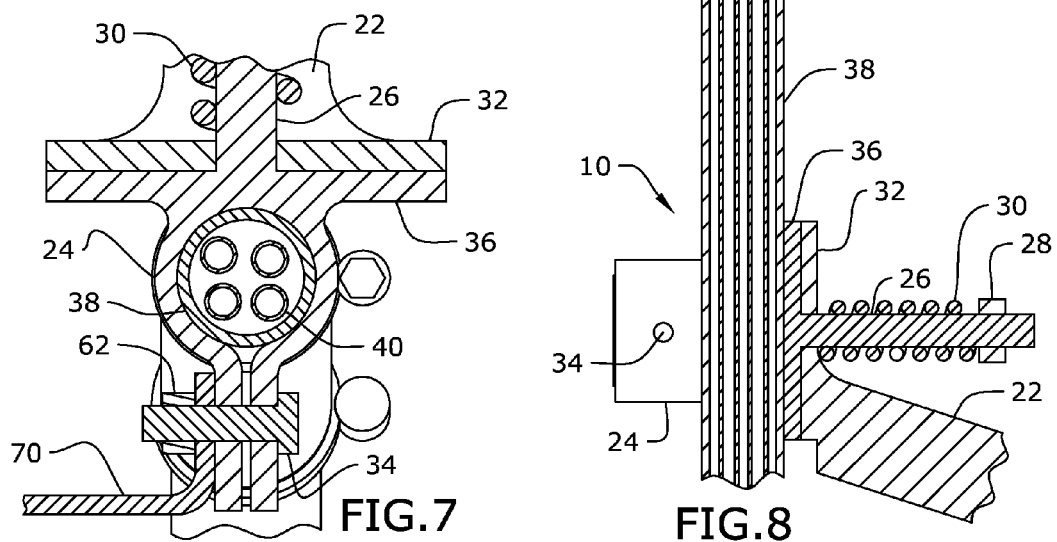

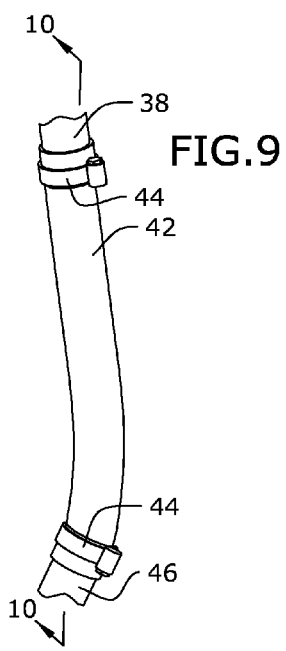
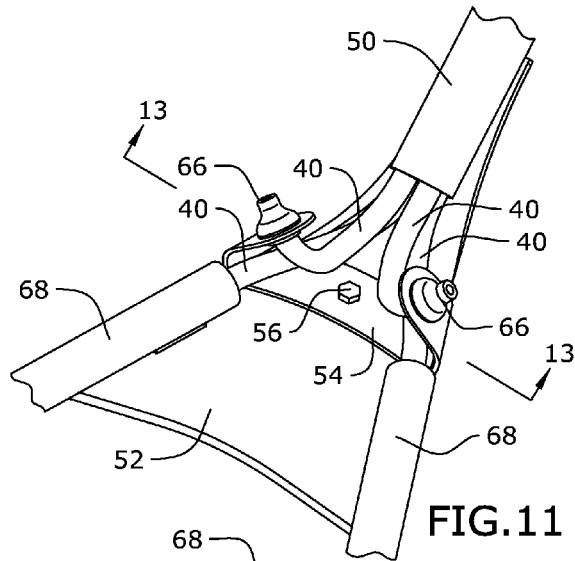
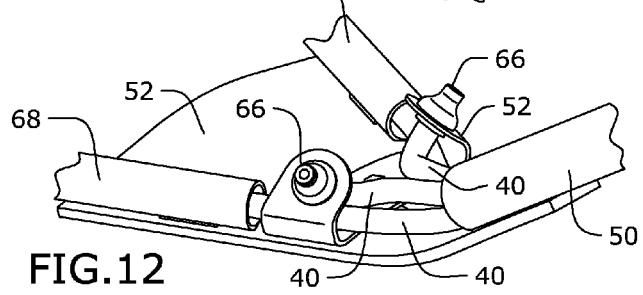
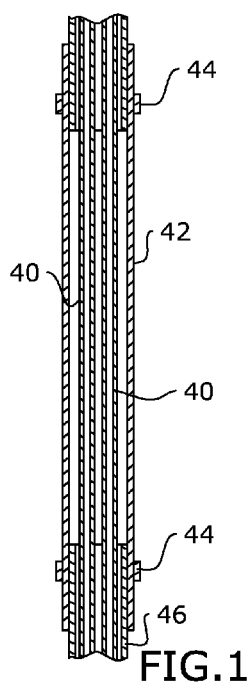
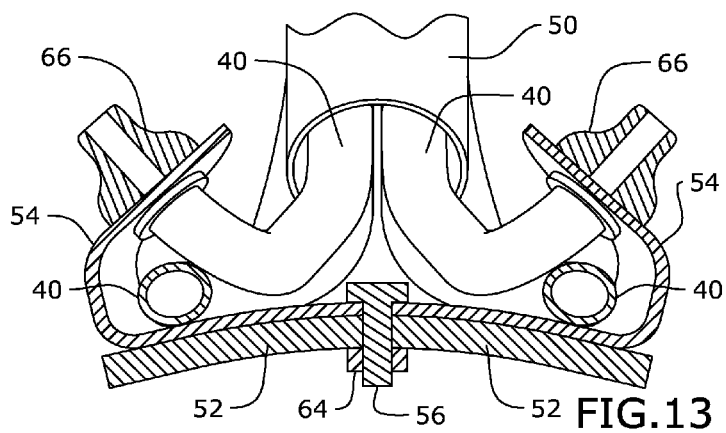

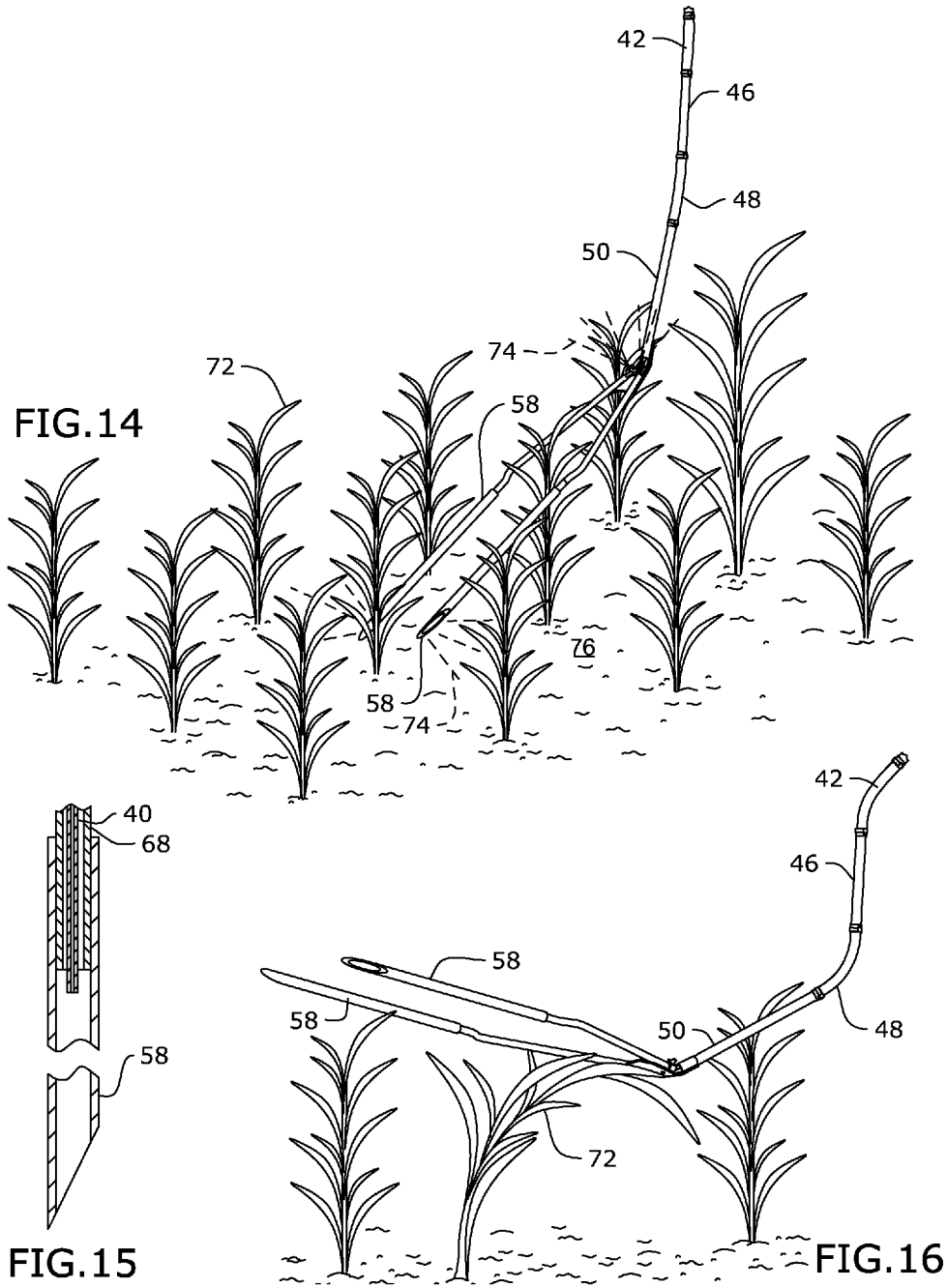

AGRICULTURAL CROP APPLICATION SYSTEM

CROSS-REFERENCE TO RELATED APPLICATION

This application claims the benefit of priority of U.S. provisional application No. 62/074,217, filed 3 Nov. 2014, the contents of which are herein incorporated by reference.

BACKGROUND OF THE INVENTION

The present invention relates to agricultural product application system and, more particularly, a movable agricultural product applicator system for dispensing various agricultural-related products along the ground surface of agricultural crops.

Current agricultural applicators are inefficient because the weight and rigidity of their applicator and delivery apparatus as well as these components' connection with their supporting boom causes at least the following problems: crop damage during use, damage to the applicator as it traverses varied terrain, attachment to and removal of the boom to the applicator and/or delivery apparatus is time-consuming, poor placement of the applicator relative to the boom and the crops, and the imposition of limits on the width of the boom.

As can be seen, there is a need for a movable agricultural product applicator system for dispensing various agricultural-related products along the ground surface of agricultural crops so as to overcome the above-mentioned problems.

SUMMARY OF THE INVENTION

In one aspect of the present invention, a system for dispersing product along a ground surface of a field of crops using a mobile supporting boom spanning portions of the field of crops includes a hose assembly extending from a proximal end to a distal end; a swivel connection rotatably connecting the proximal end to the supporting boom, wherein the swivel connection is movable from a retracted position to an extended position; and an applicator connected to the distal end, whereby the applicator drags along the ground surface.

In another aspect of the present invention, system for dispersing product along a ground surface of a field of crops using a mobile supporting boom spanning portions of the field of crops having a hose assembly extending from a proximal end to a distal end, wherein the hose assembly includes a plurality of tubular components, wherein at least one of the plurality of tubular components extends along a longitudinal axis, and wherein the at least one of the plurality of tubular components is adapted to bend about the longitudinal axis in any direction; a swivel connection rotatably connecting the proximal end to the supporting boom, wherein the swivel connection is movable from a retracted position to an extended position, and wherein the swivel connection includes a boom extension plate interconnecting the hose assembly and the supporting boom, wherein the boom extension plate forms a bearing hole; a tube bracket joined to a plate post, wherein the tube bracket attaches to the proximal end, wherein the plate post extends through the bearing hole so that a protruding portion of the plate post is provided; and a spring disposed on the protruding portion so as to bias the swivel connection in the retracted position; a hang hook connected to the tube bracket; an applicator connected to the distal end; and a mounting assembly for removably securing the swivel connection to the supporting boom, wherein the swivel connection is rotatable so that a portion of the applicator can be supported by the hang hook of an adjacent tube bracket.

These and other features, aspects and advantages of the present invention will become better understood with reference to the following drawings, description and claims.

BRIEF DESCRIPTION OF THE DRAWINGS

FIG. 5 is a detailed perspective view of an exemplary embodiment of the present invention, demonstrating rotation to a rotated configuration;

FIG. 6 is a detailed perspective view of an exemplary embodiment of the present invention, demonstrating an extended configuration;

FIG. 7 is a section detail view of an exemplary embodiment of the present invention, taken along line 7-7 of FIG. 6;

FIG. 8 is a section detail view of an exemplary embodiment of the present invention, taken along line 8-8 of FIG. 3;

FIG. 9 is a perspective detail view of an exemplary embodiment of the present invention;

FIG. 10 is a section detail view of an exemplary embodiment of the present invention, taken along line 10-10 of FIG. 9;

FIG. 11 is a perspective detail view of an exemplary embodiment of the present invention;

FIG. 12 is a perspective detail view of an exemplary embodiment of the present invention;

FIG. 13 is a section detail view of an exemplary embodiment of the present invention, taken along line 13-13 of FIG. 11;

FIG. 14 is a perspective view of an exemplary embodiment of the present invention, shown in use;

FIG. 15 is a section detail view of an exemplary embodiment of the present invention, taken along line 15-15 of FIG. 2;

FIG. 16 is a perspective view of an exemplary embodiment of the present invention, shown in use;

DETAILED DESCRIPTION OF THE INVENTION

Figure 1:
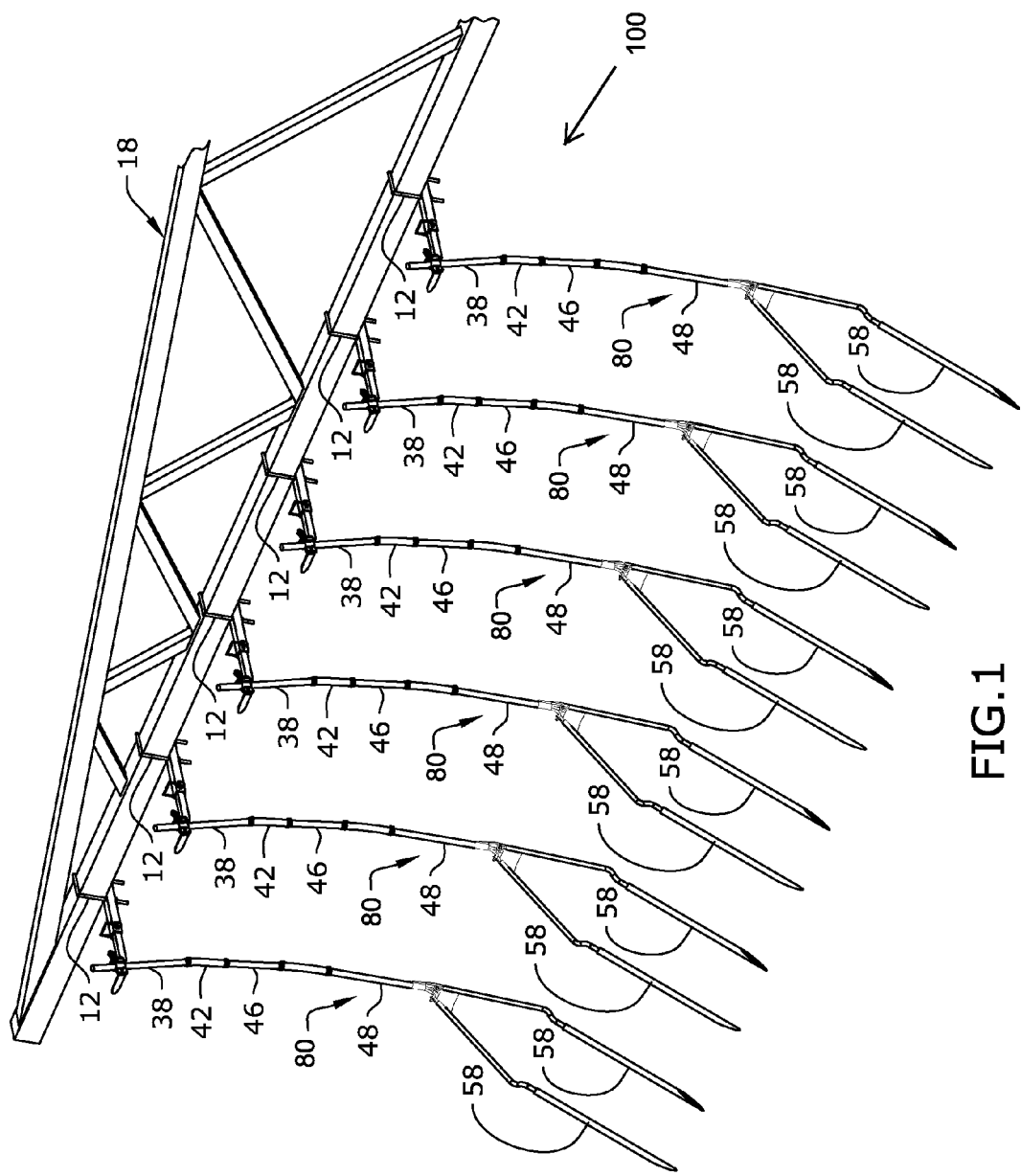
FIG. 1 is a perspective view of an exemplary embodiment of the present invention, shown in an exemplary configuration in use.
Figure 2:
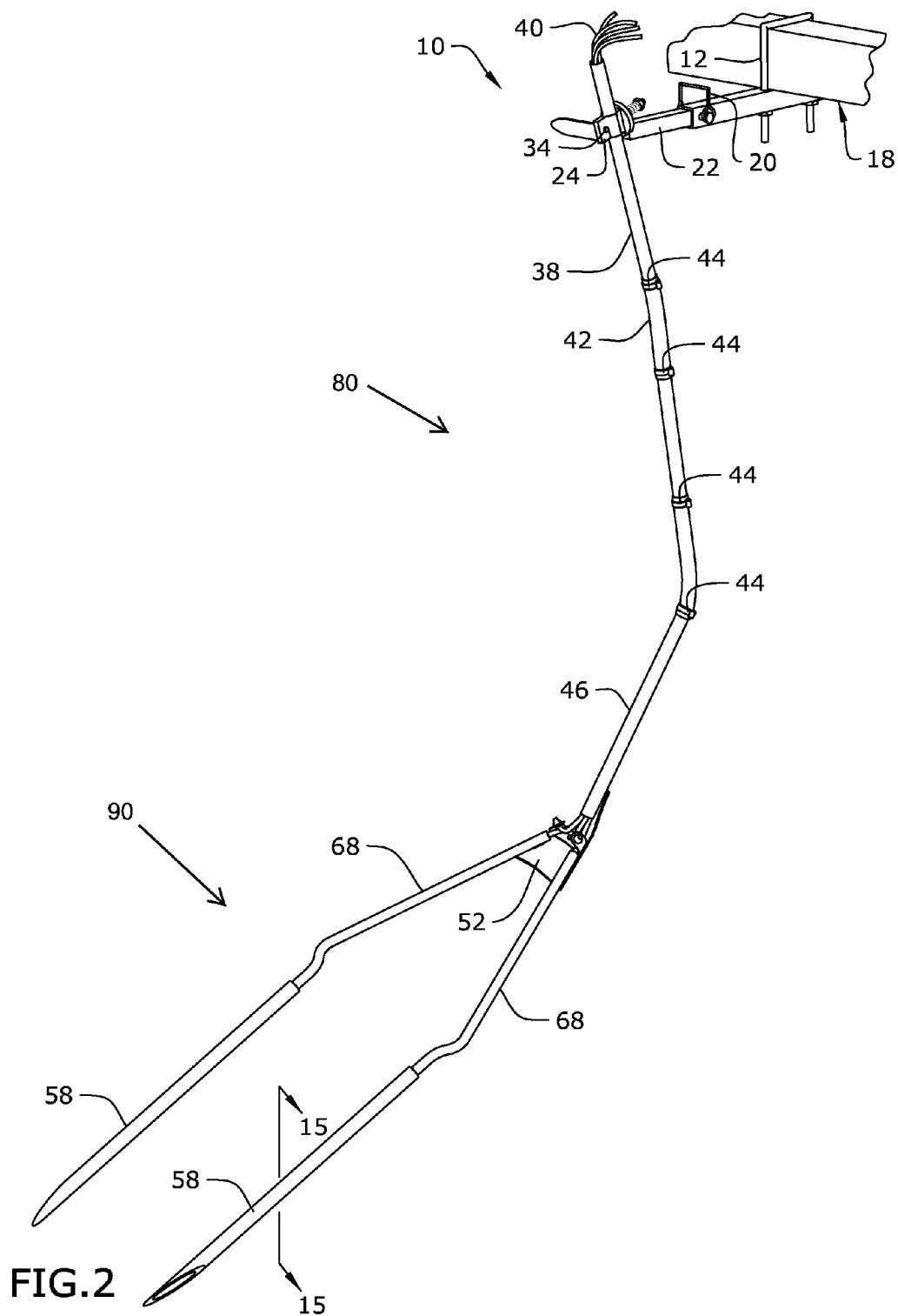
FIG. 2 is a perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a movable agricultural product applicator system for dispensing various agricultural-related products along the ground surface of agricultural crops. The application system provides a hose assembly interconnecting a supporting boom and an applicator, wherein the applicator drags along the ground surface dispensing product as the supporting boom spans across the crop field as it is moved by a carrier. The application system may include a swivel connection facilitating a rotational and pivotal connection of the hose assembly to the supporting boom, wherein a mounting assembly removably mounts the application system to the supporting boom. The hose assembly is designed with bending properties that enable the applicator to self-center and locate rows between crops as it is being dragged along the ground surface, as well as enable the applicator to surf above obstacles.

Referring to FIGS. 1 through 18, the present invention may include an agricultural product application system 100 for dispensing various agricultural-related products 74 along the ground surface 76 of agricultural crops 72. The product 74 may be fluids, gases, or solid/particulate, such as water, insecticide, herbicide or fertilizer. The application system 100 may include a hose assembly 80 interconnecting a supporting boom 18 and an applicator 90, wherein the applicator 90 drags along the ground surface 76 dispensing the product 74 as the supporting boom 18 is moved by a carrier. The application system 100 may include a swivel connection 10 enabling a rotational and pivotal connection of the hose assembly 80 to the supporting boom 18, wherein a mounting assembly 78 removably mounts the application system 100 to the supporting boom 18. The hose assembly 80 is designed with bending properties that enable the applicator 90 to self-center and locate rows between crops 72 as it is being dragged along the ground surface, as well as enable the applicator to surf above obstacles.

Figure 4:
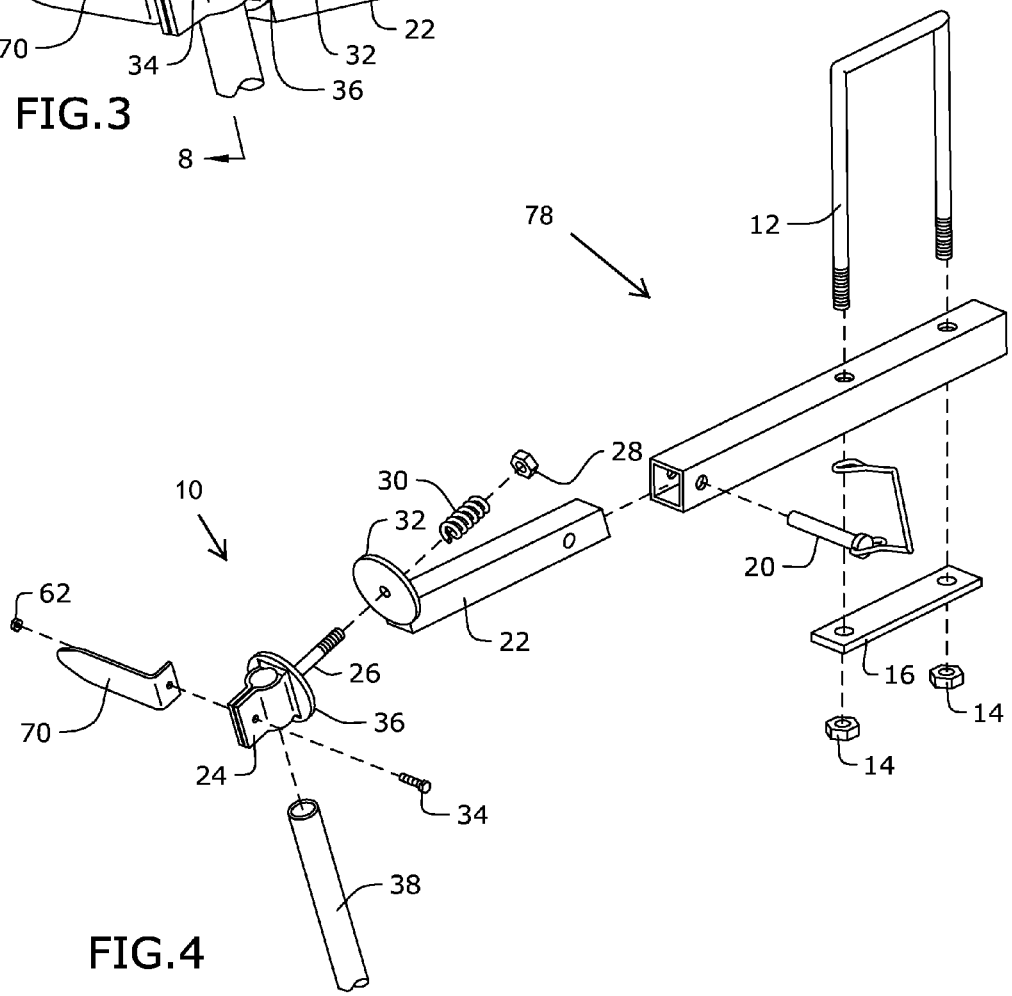
FIG. 4 is a detailed exploded view of an exemplary embodiment of the present invention.

The mounting assembly 78 may interconnect the hose assembly 80 and the applicator 90 to the supporting boom 18. The mounting assembly 78 may enable an extendable connection between the hose assembly 80 and the supporting boom 18. The mounting assembly 78 may include a boom extension 21, a first fastener 12—such as a u-clip bolt, for removably securing the boom extension 21 the supporting boom 18—second fasteners 14 and a boom extension 21 to secure the first fastener 12 to the boom extension 21, as illustrated in FIG. 4. The mounting assembly 78 may facilitate a quick release attachment and detachment of the boom extension 21 to the supporting boom 18 for ready transportation and storage of the application system 100 or portions thereof.

An extendable connector 22 may telescopically slide into a cavity of the boom extension 21 so that the extendable connector 22 moves from a retracted position to an extended position, wherein the extended position may be secured by a retainer clip 20, as illustrated in FIG. 4.

Figure 3:
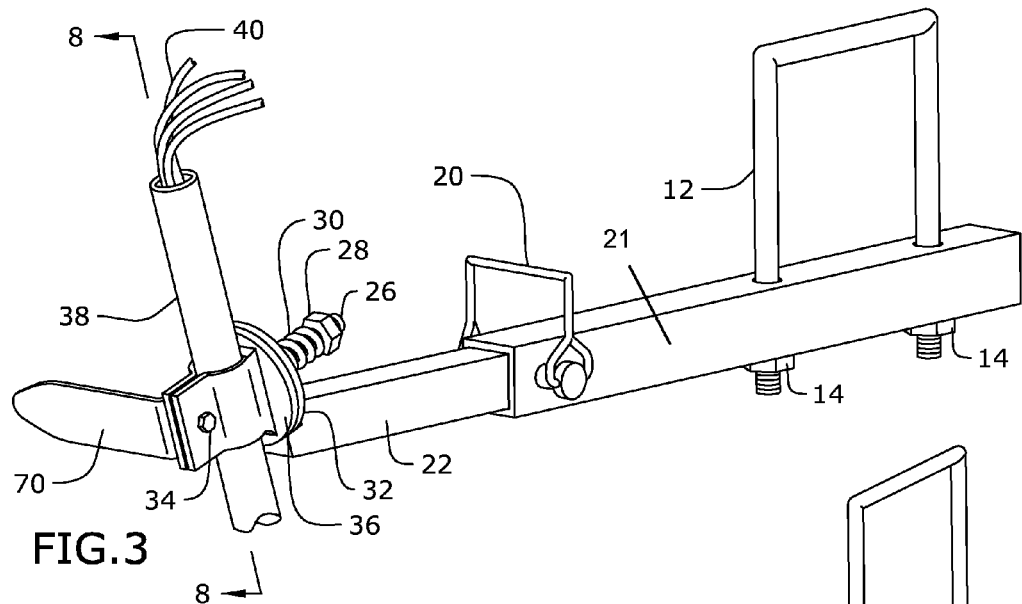
FIG. 3 is a detailed perspective view of an exemplary embodiment of the present invention.
Figure 17:
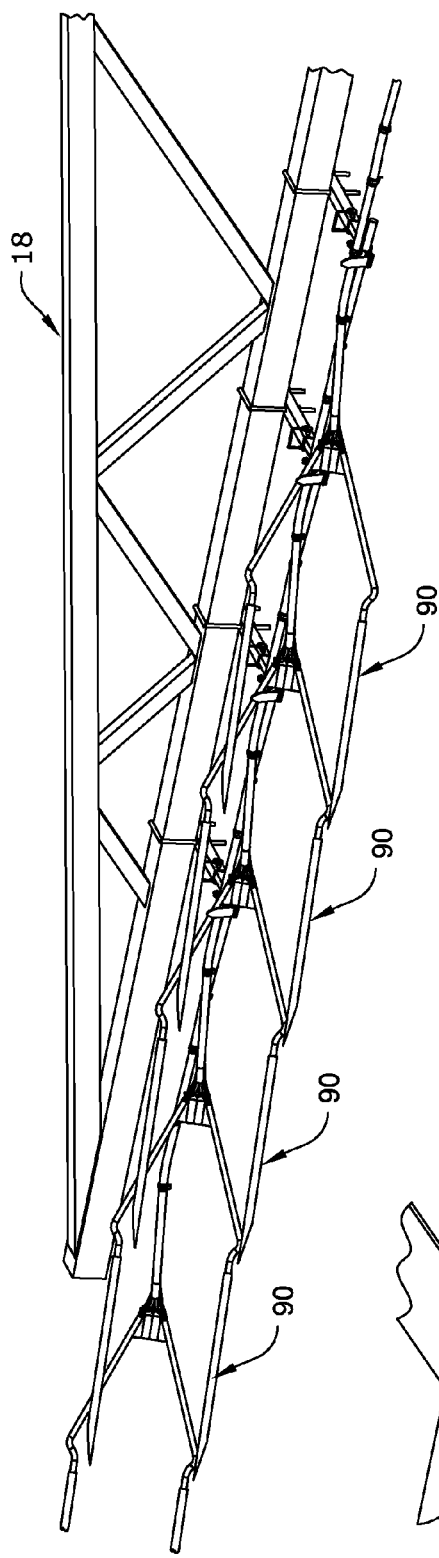
FIG. 17 is a perspective view of an exemplary embodiment of the present invention, shown in an exemplary rotated configuration in use.

The swivel connection 10 may interconnect the mounting assembly 78/extendable connector 22 and the hose assembly 80 so that the latter can rotate 360 degrees relative to a longitudinal axis of the former, whereby the hose assembly 80 is movable to a rotated configuration as illustrated in FIGS. 5 and 17. In certain embodiments, the swivel connection 10 may include a boom extension plate 32 and an opposing tube plate 36, wherein the tube plate 36 provide a plate post 26 perpendicularly and centrally joined thereto so that the plate post 26 extends to rotatably engage and journal through a centrally disposed bearing hole of the boom extension plate 32, as illustrated in FIGS. 3 and 4. The portion of the plate post 26 that protrudes through the bearing hole of the boom extension plate 32 may be threaded so that a threaded fastener 28 may be secured thereto. A spring 30 may be disposed along the protruding portion of the plate post 26 so as to be sandwiched between the threaded fastener 28 and the extension plate 32, thereby spring biasing the hose assembly 80 in a contracted configuration, as illustrated in FIGS. 3 and 5, yet movable to an extended configuration, as illustrated in FIG. 6. Such spring biasing allows the hose assembly 80 to pivot or flex temporarily to the extended configuration, such as when colliding with crops 72 or a terrain 76 of a higher elevation, so as to be urged back to the biased contracted configuration when no longer loaded by the force of such resistance, avoiding damage to the hose assembly 80, attached applicator 90, and/or crops 72 in such situations. Accordingly, the hose assembly 80 may both rotate about the longitudinal axis of the extension connector 22 as well as flex/pivot along the same longitudinal axis.

Figure 18:
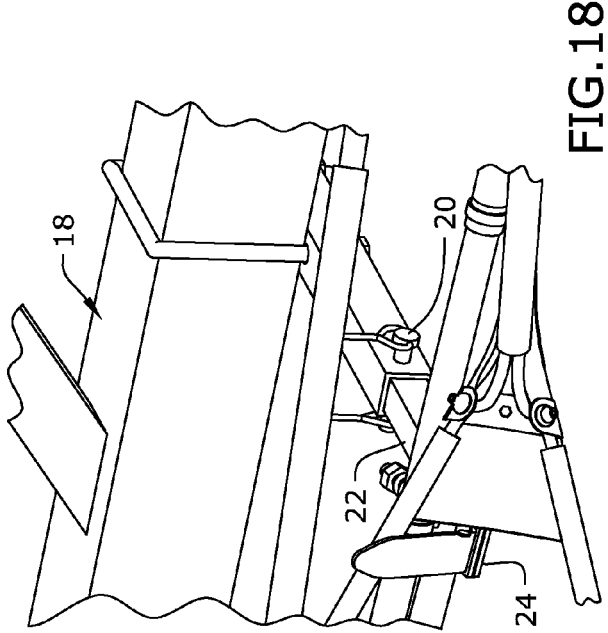
FIG. 18 is a perspective detail view of an exemplary embodiment of the present invention.

The tube plate 36 may be joined to a tube bracket 24 dimensioned and adapted to slidably receive and secure to the hose assembly 80 or a portion thereof, such as an upper rigid tube 38. A hang hook 70 may be connected to the tube plate by the same means for securing the rigid tube 38, for example by a lock fastener 34 and nut 62. The hang hook 70 may be disposed so as to support a portion of the hose assembly 80 when in the rotated configuration, as illustrated in FIG. 18.

The hose assembly 80 may include a plurality of modular tubular components 82 removably attachable to each other in various configurations by a plurality of clamps 44 so that the plurality of modular tubular components 82 slidably receive a plurality of product delivery hoses 40, protecting said delivery hoses 40 as they fluidly interconnect a product source and the applicator 90. The product delivery hoses 40, the hose assembly 80, the applicator 90, and components thereof are made of lightweight, durable and resilient material. In certain embodiments, the plurality of interchangeable modular tubular components 82 may include the upper rigid tube 38, an upper flex hose 42, a middle rigid tube 46, a middle flex hose 48 and a lower rigid tube 50 sequentially interconnected by the plurality of clamps 44. The flex hoses 42, 48 are adapted to be bend about their longitudinal axis in any direction so that when portions of the hose assembly 80 encounters resistance—be it the crops 72 or obstacles like terrain 76 of a higher elevation—at least one flex hose 42, 48 bends so that the applicator 90 lifts up against said resistance, as illustrated in FIG. 16. Such bending and lifting or "surfing" prevents crop damage and damage to the applicator 90 hitting obstacles. This bending property or flexibility also facilitates the applicator 90 to "find" the rows between the crops 72 as the applicator 90 moves along the path of least resistance—as compared to the more resistive crops 72 themselves. Likewise, this bending property or flexibility enables the hose assembly 80 and the attached applicator 90 to be "self-centering" as the applicator 90 drags along the terrain 76, much like dragging a broom is self-centering, because the path of least resistance is a path generally aligned and in tow with the hose assembly 80.

The applicator 90 may be attached to the distal end of the hose assembly 80 by a reinforcement plate 52. The reinforcing plate 52 may form two rigid tubes 68 wherein the two rigid tubes are divergently oriented. The reinforcement plate 52 may be dimensioned and adapted to support the plurality of product delivery hoses 40 and/or lower rigid tube 50. The plurality of product delivery hoses may transition from the lower rigid tube 50 to the applicator 90, wherein at least one product delivery hose 40 continues through each rigid tube 68 and where two product delivery hoses 40 terminate at opposing nozzles 66 between the rigid tubes 68 and the lower rigid tube 50, as illustrated in FIGS. 11-13. A nozzle accessory bracket 54 may be connected to the reinforcement plate 52 by a bracket fastener 56 and nut 64 so as to support the opposing nozzles 66. Each distal end of the two rigid tubes 68 may connect to angle-cut tubes 58, wherein each continuing product delivery hose 40 terminates therein, as illustrated in FIG. 15. The distal end of each angle-cut tube 58 may be dimensioned and adapted to provide a directional tip for delivering the product 74.

A method of using the present invention may include the following. The application system 100 disclosed above may be provided. A user may mount the application system 100 to the boom 18 using the mounting assembly 78, wherein the boom 18 is connected to heavy duty carrier (not shown), such as a tractor. Then the user may connect the plurality of product delivery hoses 40 protruding through the upper rigid tube 38 to the product source, possibly also located on the heavy duty carrier. Then the user may adjust the length of the hose assembly 80 by selectively interconnecting specific plurality of modular tubular components 82 so that the applicator 90 drags along the terrain 76 when in use. In certain embodiments, the applicator 90 may drag along at an approximately 60 degree angle to the terrain 76, as illustrated in FIG. 14. Then the user may move the heavy duty carrier adjacent to the agricultural crops 72 and use the application system 100 to drag the applicators 90 through the crop rows so as to dispense the product 74 along the ground surface 76 of the crops 72, as illustrated in FIG. 14.

It should be understood, of course, that the foregoing relates to exemplary embodiments of the invention and that modifications may be made without departing from the spirit and scope of the invention as set forth in the following claims.

What is claimed is:

1. A system for dispersing product along a ground surface of a field of crops using a mobile supporting boom spanning portions of the field of crops, comprising:
    a hose assembly extending from a proximal end to a distal end;
    a swivel connection having a plate post rotatably connecting the proximal end to the supporting boom, wherein the swivel connection is linearly movable along a longitudinal axis of the plate post from a retracted position to an extended position, and wherein the swivel connection further comprising:
        a boom extension plate interconnecting the hose assembly and the supporting boom, wherein the boom extension plate forms a bearing hole;
        a tube bracket joined to the plate post, wherein the tube bracket attaches to the proximal end, wherein the plate post extends through the bearing hole so that a protruding portion of the plate post is provided, and wherein the spring is disposed on the protruding portion;
    a spring disposed on the swivel connection so as to bias the swivel connection in the retracted position; and
    an applicator connected to the distal end,
    whereby the applicator drags along the ground surface.

2. The system of claim 1, further comprising at least one product delivery hose supported by the hose assembly from the proximal end to the distal end thereof so that the at least one product delivery hose terminates along the applicator.

3. The system of claim 1, further comprising a hang hook connected to the tube bracket.

4. The system of claim 1, further comprising an extension connector interconnecting the supporting boom and the boom extension plate.

5. The system of claim 4, further comprising a boom arm connected to the supporting boom, wherein the boom arm is telescopically connected to the extension connector, positionable in an extended position and a retracted position.

6. The system of claim 5, further comprising a mounting assembly for removably securing the boom arm to the supporting boom.

7. The system of claim 6, wherein the mounting assembly comprises a u-clip bolt dimensioned and adapted to removably secure the boom arm to the supporting boom, wherein the u-clip bolt slides out of the boom arm.

8. The system of claim 1, wherein the hose assembly comprising a plurality of tubular components, wherein at least one of the plurality of tubular components extends along a hose longitudinal axis, and wherein the at least one of the plurality of tubular components is adapted to bend about the hose longitudinal axis in any direction.

9. The system of claim 8, wherein the at least one of the plurality of tubular components is adapted so that when a portion of the hose assembly encounters sufficient resistance the at least one of the plurality of tubular components bends so that the applicator lifts upward from the ground surface during said resistance.

10. The system of claim 2, wherein the applicator further comprises two rigid tubes that diverge, and wherein each rigid tube is adapted to receive at least one product delivery hose.

11. The system of claim 10, wherein the two rigid tubes are connected to angle-cut tubes.

12. A system for dispersing product along a ground surface of a field of crops using a mobile supporting boom spanning portions of the field of crops, comprising:
    a hose assembly extending from a proximal end to a distal end, wherein the hose assembly comprises a plurality of tubular components, wherein at least one of the plurality of tubular components extends along a hose longitudinal axis, and wherein the at least one of the plurality of tubular components is adapted to bend about the hose longitudinal axis in any direction;
    a swivel connection having a plate post rotatably connecting the proximal end to the supporting boom, wherein the swivel connection is linearly movable along a longitudinal axis of the plate post from a retracted position to an extended position, and wherein the swivel connection comprises:
        a boom extension plate interconnecting the hose assembly and the supporting boom, wherein the boom extension plate forms a bearing hole;
        a tube bracket joined to the plate post, wherein the tube bracket attaches to the proximal end, wherein the plate post extends through the bearing hole so that a protruding portion of the plate post is provided; and
        a spring disposed on the protruding portion so as to bias the swivel connection in the retracted position;
    a hang hook connected to the tube bracket;
    an applicator connected to the distal end; and
    a mounting assembly for removably securing the swivel connection to the supporting boom.

13. The system of claim 12, wherein the swivel connection is rotatable so that a portion of the applicator can be supported by the hang hook of an adjacent tube bracket.

* * * * *